United States Patent [19]
Komatsu

[11] Patent Number: 5,852,782
[45] Date of Patent: Dec. 22, 1998

[54] TRANSMISSION POWER CONTROL METHOD

[75] Inventor: Masahiro Komatsu, Tokyo, Japan

[73] Assignee: NEC Corp., Japan

[21] Appl. No.: 774,201

[22] Filed: Dec. 27, 1996

[30] Foreign Application Priority Data

Dec. 28, 1995 [JP] Japan ................................. 7-342518

[51] Int. Cl.⁶ .................................................. H04B 1/00
[52] U.S. Cl. ............................................. 455/522; 455/69
[58] Field of Search ................................ 455/68, 69, 92, 455/352, 353, 117, 127, 522

[56] References Cited

U.S. PATENT DOCUMENTS

| | | | |
|---|---|---|---|
| 5,257,283 | 10/1993 | Gilhousen et al. | 455/69 |
| 5,265,119 | 11/1993 | Gilhousen et al. | 455/69 |
| 5,267,262 | 11/1993 | Wheatley, III | 455/69 |
| 5,305,468 | 4/1994 | Bruckert et al. | 455/69 |
| 5,386,589 | 1/1995 | Kanai | 455/69 |
| 5,455,967 | 10/1995 | Amezawa et al. | 455/69 |
| 5,465,398 | 11/1995 | Flammer | 455/69 |
| 5,551,057 | 8/1996 | Mitra | 455/69 |
| 5,574,982 | 11/1996 | Almgren et al. | 455/69 |
| 5,590,409 | 12/1996 | Sawahashi et al. | 455/69 |
| 5,604,766 | 2/1997 | Dohi et al. | 455/69 |

FOREIGN PATENT DOCUMENTS 5-244056 9/1993 Japan .

*Primary Examiner*—Reinhard J. Eisenzopf
*Assistant Examiner*—Makoto Aoki
*Attorney, Agent, or Firm*—Ostrolenk, Faber, Gerb & Soffen, LLP

[57] ABSTRACT

A transmission power control method that is able to keep the signal quality approximately constant. A receiving-side station measures the average CIR for the radio communication channel in use. The receiving side station delivers a command for decreasing the transmission power to a transmitting-side station when the measured value is equal to or greater than a reference value. The receiving-side station also delivers a command for increasing the transmission power to the transmitting-side station when the measured value is less than the reference value. When a command for a preceding control period is an increase command, the transmitting power for the next control period is set as a first value obtained by subtracting a predetermined value from a prior value that precedes by the delay time. When the command for a preceding control period is a decrease command, and the sum period is not longer than the delay time, the transmitting power is set as a second value, which is a lower one of the first value and the preceding value. When the command for a preceding control period is a decrease command, and the sum period of the prior successive decrease commands is longer than the delay time, the transmitting power is set as a third value obtained by subtracting the predetermined value from the preceding value. When the detected command is the increase command, the power is set as a value in a similar way.

1 Claim, 9 Drawing Sheets

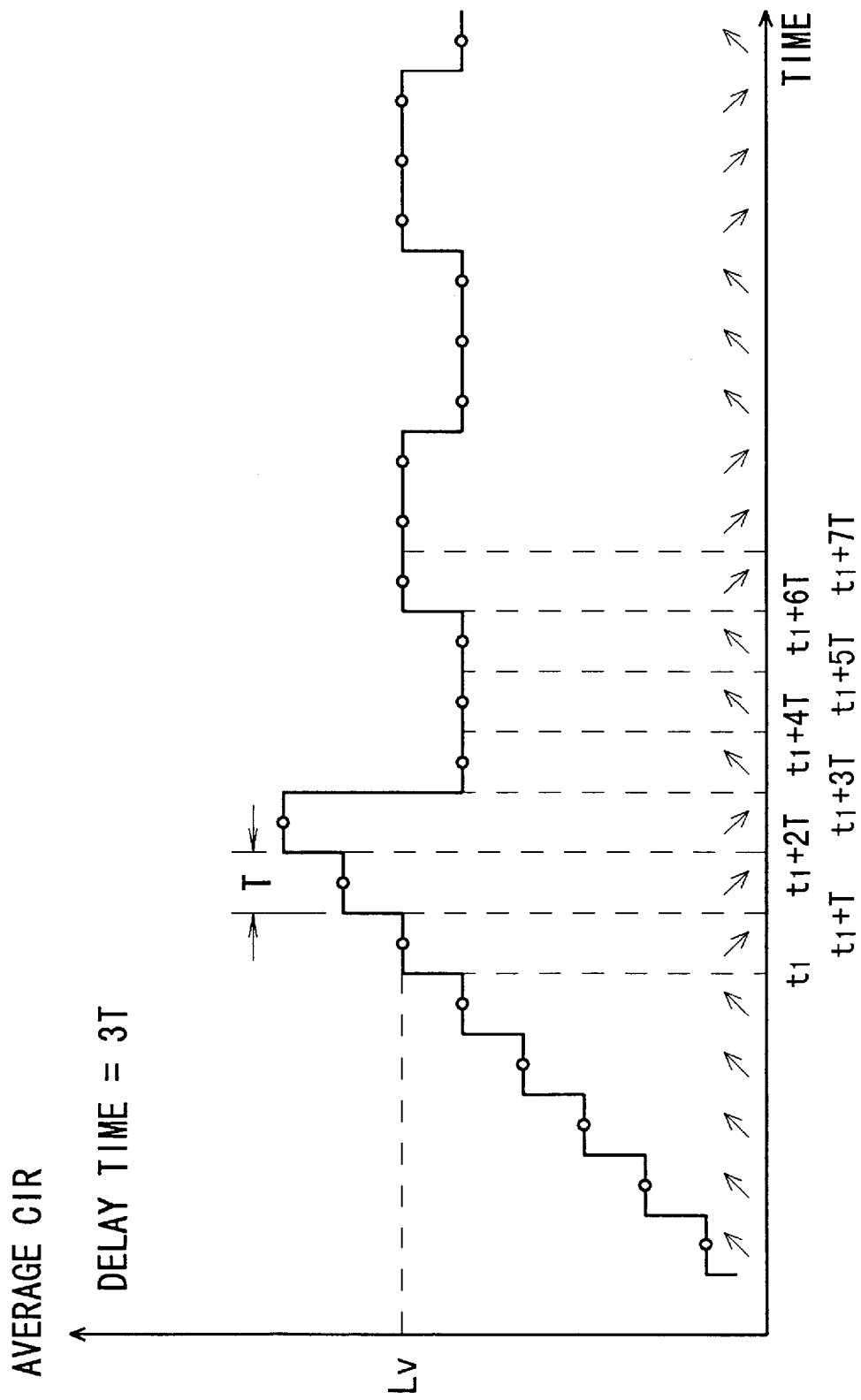

TRANSMISSION POWER CONTROL METHOD

BACKGROUND OF THE INVENTION

1. Field of the Invention

The present invention relates to a transmission power control method and more particularly, to a transmission power control method for a mobile communication network of a cellular type that is capable of two-way communications.

2. Description of the Prior Art

In radio communications in cellular type systems, such as digital automobile telephone sets, a radio communication channel is established between a base station having a transmitter and a receiver and a mobile station having a transmitter and a receiver, thereby performing two-way communications.

To keep the signal quality constant in communications of this type, a proper transmission power control is required.

FIG. 1 shows a flowchart illustrating a conventional transmission power control method, which was disclosed in, for example, the Japanese Non-Examined Patent Publication No. 5-244056 published in September 1993. The process steps in this control method are periodically performed in the base station and the corresponding mobile station during communication, respectively.

First, in the step 500, an average Carrier to Interference power Ratio (CIR) in a definite time period T (which is termed a "control period") for a radio communication channel in use is measured by the base or mobile station on the receiving side. Thus, a measured value z of the average CIR is obtained.

The CIR is expressed as the following equation.

$$CIR(dB) = P - \alpha - \beta$$

where P is the transmission power, $\alpha$ is the transmission loss, and $\beta$ is the interference power.

Next, the measured value z is compared with a predetermined reference value $L_y$ by the station on the receiving side in the step 501.

If the measured value z is greater than or equal to the reference value $L_y$, a command to decrease the transmission power P is delivered by the station on the receiving side to the mobile or base station on the transmitting side in the step 502. Then, the transmission power P for the next control period T is immediately decreased by a predetermined value D in the station on the transmitting side that has received this command in the step 504.

If, in the step 501, the measured value z is less than the reference value $L_y$, a command to increase the transmission power P is delivered by the station on the receiving side to the station on the transmitting side in the step 503. Then, the transmission power P for the next control period T is immediately increased by the same value D in the station on the transmitting side that has received this command in the step 505.

Thus, with the conventional transmission power control method as illustrated in FIG. 1, the average CIR is approximately kept at the reference value $L_y$ with time.

However, the above conventional transmission power control method has a problem that the signal quality deterioration occurs due to the time delay between the measurement of the average CIR and the change of the transmission power.

Specifically, with a typical transmission power control system using a closed loop, the average CIR is measured during a predetermined control period T to thereby obtain the measured value z in the station on the receiving side. Then, the measured value z of the CIR is compared with the reference value $L_y$ in the station on the receiving side.

Subsequently, a control bit for increasing or decreasing the transmission power is prepared in the receiving-side station according to the result of the comparison. This control bit includes a command of decreasing the transmission power for the next control period T in the case where $z \geq L_y$, and it includes a command of increasing the transmission power for the next control period T in the case where $z < L_y$. The control bit thus prepared is then inserted into a transmission frame, and is transmitted to the transmitting-side station.

The transmission frame thus transmitted is received by the transmitting-side station, and the control bit included in this frame is extracted. The transmission power of the transmission-side station is then changed (i.e., increased or decreased) according to the command included in the received bit.

Therefore, a time delay occurs from the time when the base or mobile station on the receiving side measures the average CIR to the time when the mobile or base station on the transmitting side actually changes the transmission power.

Further, when the delay time from the measurement of the average CIR to the change of the transmission power is longer than the control period T (i.e., the measuring period of the average CIR), the transmission power is increased or decreased according to the comparison result of the values z and $L_y$ within the prior measuring period T that is antecedent to the present control period T by the delay time.

As a result, even when there are no changes in the reference value $L_y$ and the characteristics of the communication or transmission channel in use and consequently, no transmission power change is necessary during the next measuring period T, the transmission power may be changed up or down according to the comparison result within the antecedent measuring period T. Thus, the transmission power is periodically changed up and down, becoming oscillatory.

This unexpected change or fluctuation in transmission power leads to the increase in control error of the power transmission, which deteriorates the signal quality.

For example, when the delay time is expressed as n·T where n is a positive integer, the oscillation or fluctuation period of the transmission power can be expressed as 2(2n−1)·T.

FIG. 2 shows an example of the transmission power oscillation of the base or mobile station on the transmitting side, where the delay time is three times the control period T, i.e., n=3. The oscillation period of the transmission power is 10 T.

As shown in FIG. 2, the transmission power is equal to the reference value $P_y$ at the time $t_1$ and therefore, the receiving side station transmits the control command for decreasing the transmission power by the predetermined value D to the transmitting-side station. Then, the transmitting-side station immediately decreases the transmission power for the next control period T by D.

However, since the time delay of the transmission control is 3T, the transmission power is kept to be increased from the time $(t_1+T)$ to the time $(t_1+3T)$, and it is first decreased at the time $(t_1+3T)$.

Similarly, the transmission power becomes lower than the reference value $P_y$ at the time $t_2$. The receiving-side station transmits the control command for increasing the transmission power by the value D to the transmitting-side station. Then, the transmitting-side station immediately increases the transmission power for the next control period T by D.

However, since the time delay of the transmission control is 3T, the transmission power decreases from the time $(t_2+T)$ to the time $(t_2 3T)$, and it is first increased at the time $(t_2+3T)$.

It is seen from FIG. 2 that the maximum fluctuation width of the transmission power is equal to 5D in the example of FIG. 2.

SUMMARY OF THE INVENTION

Accordingly, an object of the present invention is to provide a transmission power control method that is able to keep the signal quality approximately constant.

Another object of the present invention is to provide a transmission power control method that is able to restrain the periodic, oscillatory change of the transmission power.

According to a first aspect of the present invention, a transmission power control method is provided, which includes the following steps:

First, a current command for a current control period transmitted from the station on the receiving side is detected by the station on the transmitting side.

Then, it is judged whether or not the content of the detected current command is the same as that of a preceding command for a preceding control period that has been detected by the station on the transmitting side.

When the content of the current command is not the same as that of the preceding command, the transmitting power for the next control period is set as a first value.

The first value is obtained by either adding a predetermined value to a prior value of the transmission power for a prior control period that is prior to the current control period by a delay time, or subtracting the predetermined value from the prior value of the transmission power according to the content of the detected current command.

The delay time is defined as a time from detection of the current command by the station on the transmitting side to realization of the detected current command.

When the content of the current command is the same as that of the preceding command, and at the same time, a sum period of successive control periods having the same command which are prior to the current control period is not longer than the delay time, the transmitting power for the next control period is set as a second value.

The second value is a lower or higher one of the first value and the preceding value of the transmission power according to the content of the detected current command.

When the content of the current command is the same as that of the preceding command, and at the same time, the sum period is longer than the delay time, the transmission power for the next control period is set as a third value.

The third value is obtained by either adding the predetermined value to the preceding value of the transmission power, or subtracting the predetermined value from the preceding value of the transmission power according to the content of the detected current command.

With the transmission power control method according to the first aspect of the invention, the transmission power for the next control period is set as the first, second, or third value according to the content of the current command.

The first value is applied to the case where the content of the current command is not the same as that of the preceding command. Since the current command has been delivered at the time prior to the current control period by the delay time, the command delivered at this time is used for the transmitting power for the next control period.

The second value is applied to the case where the content of the current command is the same as that of the preceding command, and at the same time, a sum period of successive control periods having the same command which are prior to the current control period is not longer than the delay time. In this case, the first value or the preceding value of the transmission power may be taken at the time prior to the current control period by the delay time or in the preceding control period. Therefore, the higher or lower one of the first value or the preceding value is used for the transmitting power for the next control period.

The third value is applied to the case where the content of the current command is the same as that of the preceding command, and at the same time, the sum period is longer than the delay time. This case corresponds to that the reference value with which the receiving side station changes the content of the command (for example, the reference value of the CIR) is changed. Therefore, the sum or difference of the preceding value and the predetermined value is used for the transmitting power for the next control period.

Consequently, the transmission power transmitted by the station on the transmitting side has a small fluctuation. This means that the periodic, oscillatory change of the transmission power in the above conventional method is able to be restrained.

As a result, the signal quality is able to be kept approximately constant.

According to a second aspect of the present invention, another transmission power control method is provided, which includes the following steps:

First, the average CIR in a current control period is detected by a station on the receiving side.

Then, the detected average CIR is compensated by using a prior command for a prior current control period that has been transmitted to a station on the transmitting side and that is included in a delay time.

The delay time is defined as a time from detection of the current command by the station on the transmitting side to realization of the detected current command.

The compensated average CIR for the current control period is compared with a reference value. When the compensated average CIR is equal to or greater than the reference value, a command for a next current control period is set to decrease the current transmission power by a predetermined value.

When the compensated average CIR is less than the reference value, the command for the next current control period is set to increase the current transmission power by the predetermined value.

Then, the command for the next control period is transmitted by the station on the receiving side to the station on the transmitting side.

With the transmission power control method according to the second aspect of the invention, the average CIR for the current control period is detected and then, it is compensated by using the prior command that has been transmitted to the station on the transmitting side and that is included in the delay time.

Further, by comparing the compensated average CIR for the current control period with the reference value, the command for the next current control period is set to decrease or increase the current transmission power by the predetermined value.

Accordingly, the transmission power transmitted by the station on the transmitting side has a small fluctuation. This means that the periodic, oscillatory change of the transmission power in the above conventional method is able to be restrained.

As a result, the signal quality is able to be kept approximately constant.

BRIEF DESCRIPTION OF THE DRAWINGS

In order that the present invention may be readily carried into effect, it will now be described with reference to the accompanying drawings.

FIG. 5A is a diagram showing the change of the average CIR with time in the transmission power control method according to the first embodiment.

DETAILED DESCRIPTION OF THE PREFERRED EMBODIMENTS

Figure 1:
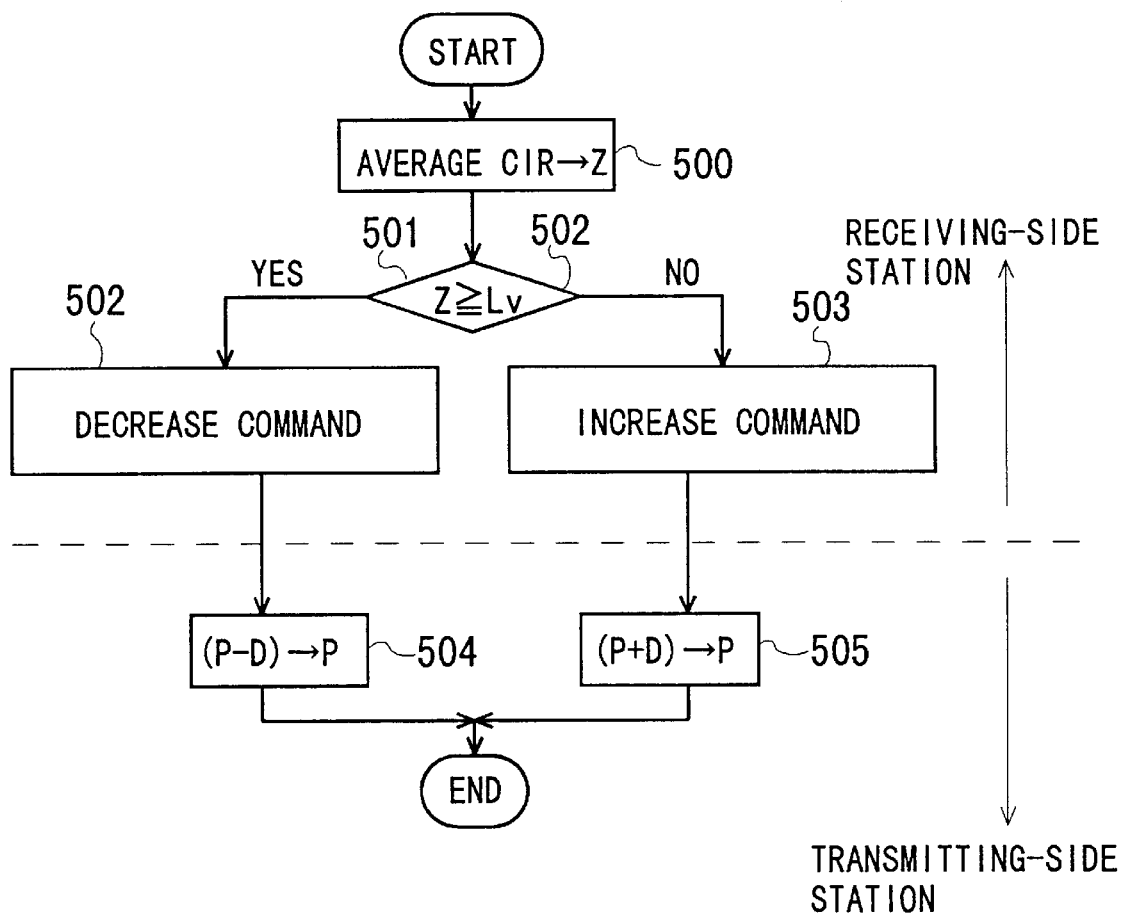
FIG. 1 is a flowchart for illustrating a conventional transmission power control method.
Figure 2:
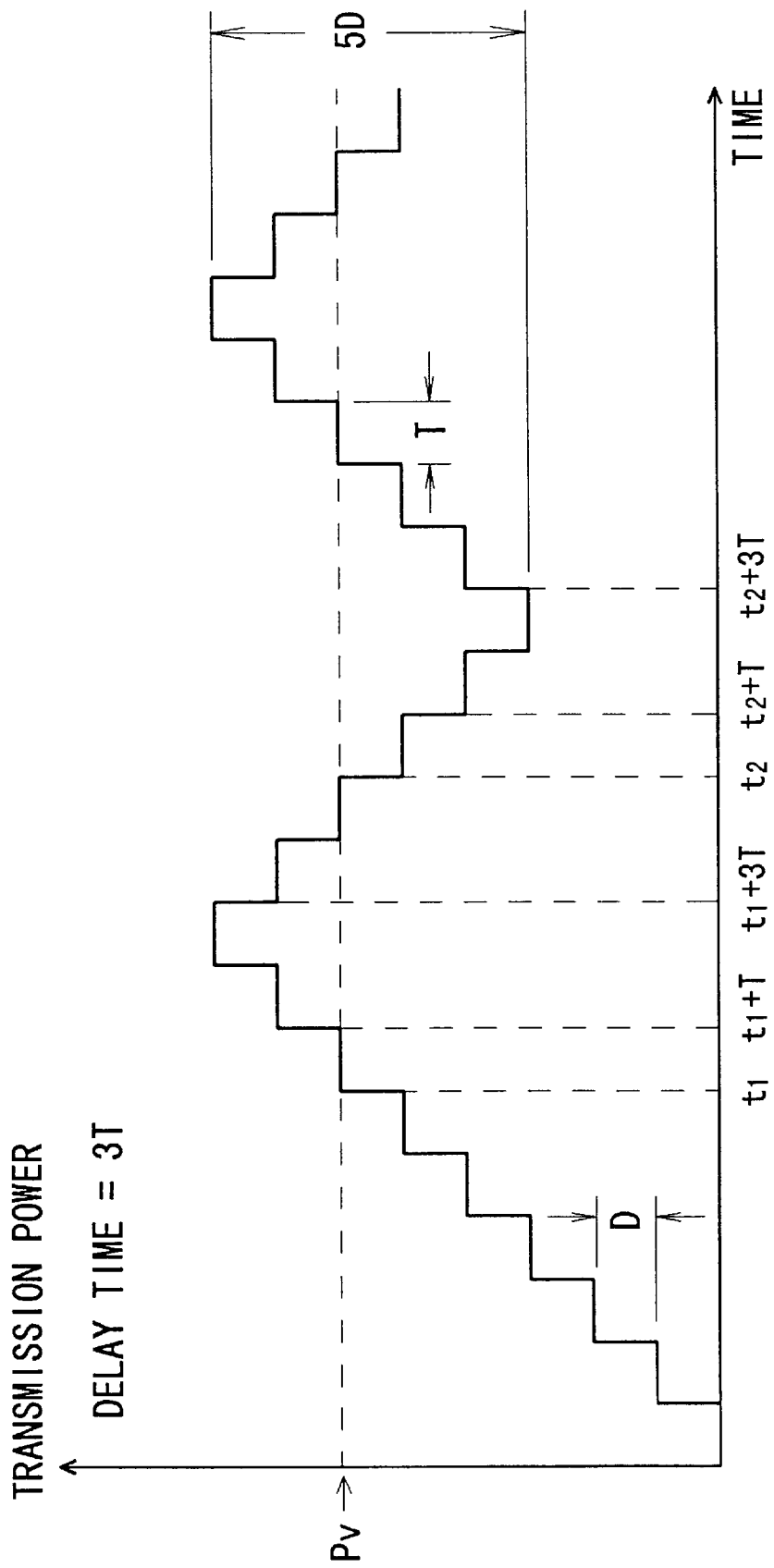
FIG. 2 is a diagram showing the change of the transmission power with time in the conventional transmission power control method.

Preferred embodiments of the present invention will be described below referring to the drawings attached.

First Embodiment

Figure 3:
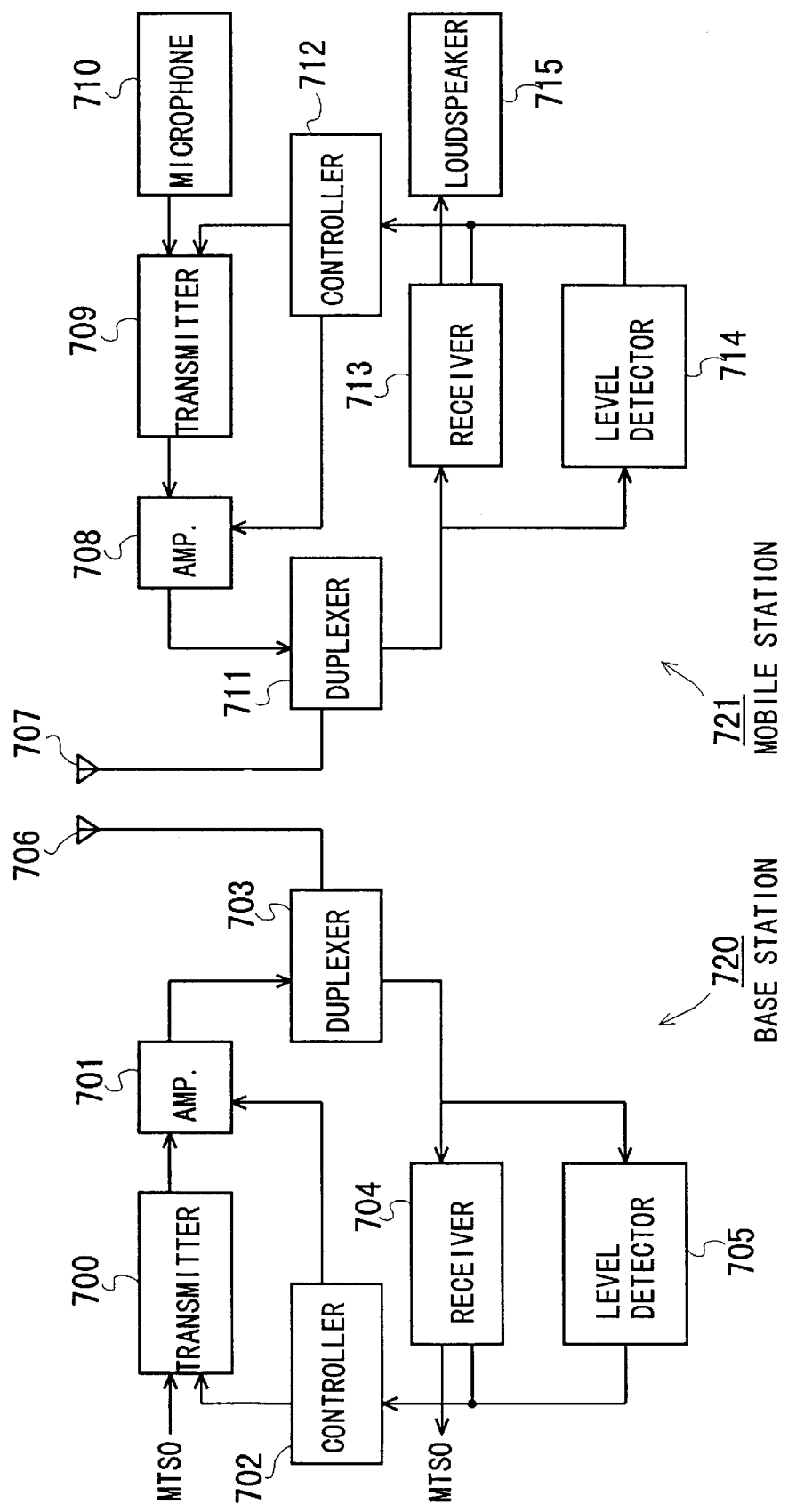
FIG. 3 is a block diagram showing a transmission power control system used for performing the transmission power control methods according to first and second embodiments of the present invention.

In a transmission power control method according to a first embodiment of the present invention, a transmission power control system having the configuration shown in FIG. 3 is used. This system includes a base station 720 and a mobile station 721.

First, the flow of a sound signal during communication is described below.

A sound signal transmitted from a Mobile Telephone Switching Office (MTSO) (not shown) is modulated into a radio signal by a transmitter 700 in the base station 720. Then, the radio signal thus generated is amplified by an amplifier 701. The amplified radio signal is then transmitted from an antenna 706 through a duplexer 703.

The transmitted radio signal from the base station 720 is received by an antenna 707 of the mobile station 721. Then, the received signal is sent through a duplexer 711 to a receiver 713. The signal is demodulated by the receiver 713 and the demodulated signal is inputted into a loudspeaker 715, outputting a voice therefrom.

On the other hand, a voice inputted into a microphone 710 in the mobile station 721 is converted to a voice signal by the microphone 710. The voice signal is inputted into a transmitter 709. The voice signal thus inputted is modulated into a radio frequency signal in the transmitter 709 and then, is amplified by an amplifier 708. This amplified signal is transmitted from the antenna 707 through the duplexer 711.

The radio frequency signal thus transmitted is received by the antenna 706 in the base station 720. Then, the signal is sent to a receiver 704 through the duplexer 703 and is demodulated in the receiver 704. The demodulated signal is inputted into the MTSO from the receiver 704.

A level detector 705 in the base station 720 serves to detect the level of the received signal, thereby measuring the CIR of the received signal. A level detector 714 in the mobile station 721 serves to detect the level of the received signal, measuring the CIR of the received signal.

A control 702 in the base station 720 mainly has a capability of (a) receiving the measured CIR by the level detector 705 and delivering a transmission power control command from the antenna 706 through the transmitter 700, (b) receiving a transmission power control command transmitted from the mobile station 721 to thereby increase or decrease the transmission power of the amplifier 701 by a predetermined control step value D, and (c) detecting the present or current transmission power transmitted from the base station 720.

Similarly, a controller 712 in the mobile station 721 mainly has a capability of (a') receiving the measured CIR by the level detector 714 and delivering a transmission power control command from the antenna 707 through the transmitter 709, (b') receiving a transmission power control command transmitted from the base station 720 to thereby increase or decrease the transmission power of the amplifier 708 by a predetermined control step value D, and (c') detecting the present or current transmission power transmitted from the mobile station 721.

Figure 4:
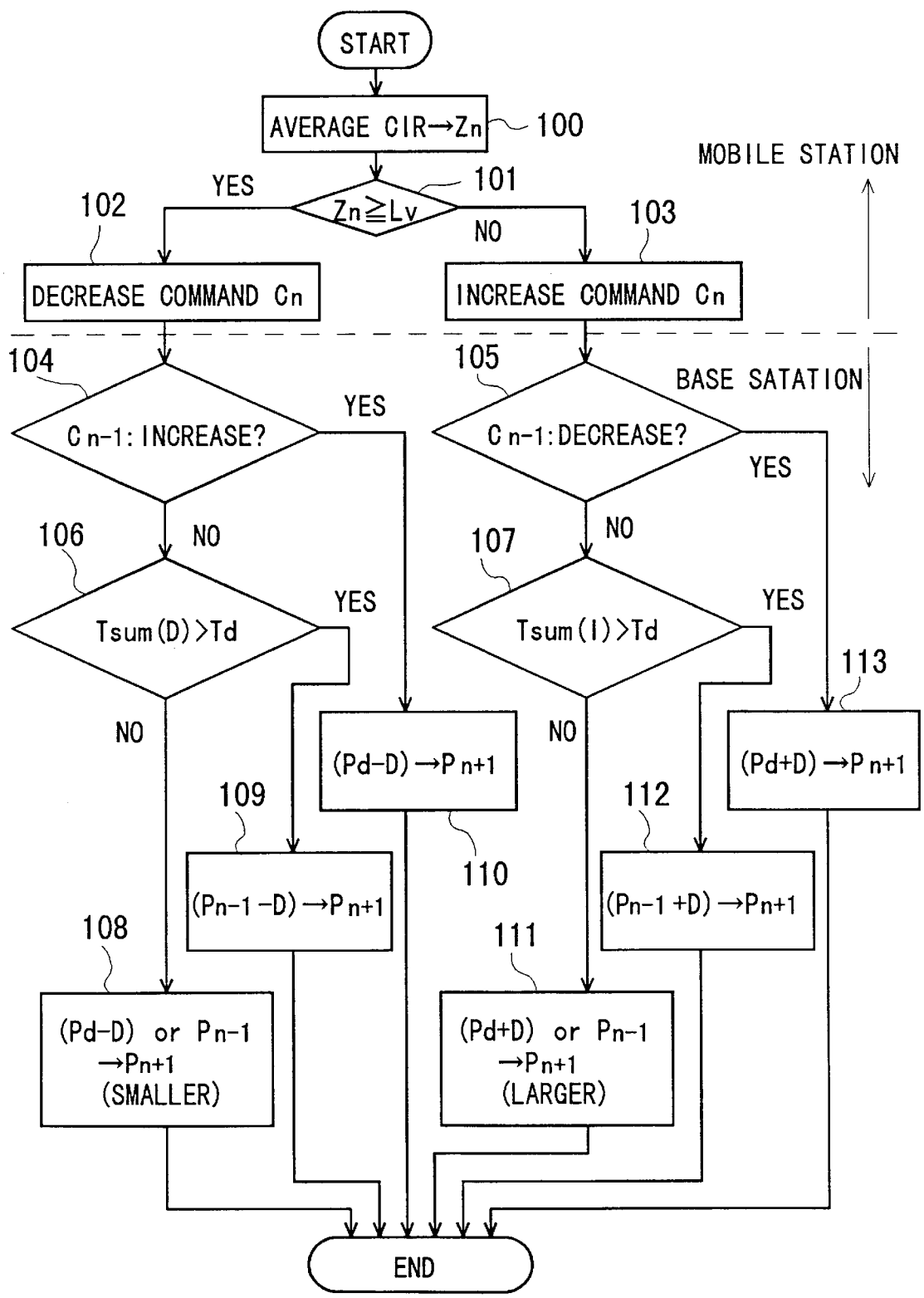
FIG. 4 is a flowchart illustrating the transmission power control method according to the first embodiment.

The transmission power control method according to the first embodiment has the step sequence shown in FIG. 4. This sequence is periodically performed in the base station 720 and the mobile station 721 during communication. In this case, one of the base station 720 and the mobile station 721 is on the transmitting side and the other is on the receiving side.

First, the average CIR within a current or n-th control period $T_n$ for the radio communication channel in use is measured by the level detector 714 in the mobile station 721 on the receiving side, where n is a natural number. Thus, a measured current value $z_n$ of the average CIR in the n-th control period $T_n$ is obtained in the step 100.

Next, the measured value $z_n$ of the average CIR is compared with a reference value $L_v$ by the controller 712 in the mobile station 721 in the step 101.

Then, if the measured value $z_n$ of the average CIR is greater than or equal to the reference value $L_v$ in the step 101, a command $C_n$ for decreasing the transmission power (i.e., the decrease command) with respect to the transmission power within a preceding control period $T_{n-1}$ is delivered by the controller 712 of the mobile station 721 to the base station 720 on the transmitting side in the step 102.

If, in the step 101, the measured value $z_n$ of the average CIR is less than the reference value $L_v$, a command $C_n$ for increasing the transmission power (i.e., the increase command) with respect to the transmission power within the preceding control period $T_{n-1}$ is delivered by the controller 712 of the mobile station 721 to the base station 720 in the step 103.

The base station 720 on the transmitting side that has received this transmission power control command $C_n$ takes the following steps on the command.

First, when the current or n-th command $C_n$ is the decrease command, it is judged in the step 104 whether a preceding command $C_{n-1}$ in the preceding control period $T_{n-1}$ with respect to the current control period $T_n$ is the increase command or not. Then, if the preceding command $C_{n-1}$ is the increase command, a next transmission power $P_{n+1}$ in a next control period $T_{n+1}$ is set as a value of $(P_d-D)$ in the step 110.

Here, $P_d$ is the transmission power in the prior control period $T_p$ prior to the n-th control period $T_n$ by the delay time $T_d$, and D is the incremental or decremental value by which the transmission power is increased or decreased within each control period.

The delay time $T_d$ is defined as a time from detection of the current command by the base or mobile station 720 or 721 on the transmitting side to realization of the detected current command.

In the step 104, if the preceding command $C_{n-1}$ is the decrease command, it is further judged in the step 106 whether the sum period $T_{sum}$ (D) of the prior successive control periods where the decrease commands have been received is longer than the delay time $T_d$ or not. Then, if the sum period $T_{sum}$ (D) is longer than the delay time $T_d$, the next transmission power $P_{n+1}$ in the next control period $T_{n+1}$ is set as a value $(P_{n-1}-D)$ in the step 109, where $P_{n-1}$ is the transmission power in the preceding control period $T_{n-1}$.

If, in the step 106, the sum period $T_{sum}$ (D) is not longer than the delay time $T_d$, the next transmission power $P_{n+1}$ in the next control period $T_{n+1}$ is set as a smaller one of values $(P_d-D)$ and $P_{n-1}$ in the step 108.

On the other hand, when the current or n-th command $C_n$ is the increase command in the step 103, it is judged in the step 105 whether the preceding command $C_{n-1}$ is the decrease command or not. Then, if the preceding command $C_{n-1}$ is the decrease command, the next transmission power $P_{n+1}$ in the next control period $T_{n+1}$ is set as a value of $(P_d+D)$ in the step 113.

In the step 105, if the preceding command $C_{n-1}$ is the increase command, it is further judged in the step 107 whether the sum period $T_{sum}$ (T) of the prior successive control periods where the increase commands have been received is longer than the delay time $T_d$ or not. Then, if the sum period $T_{sum}$ (I) is longer than the delay time $T_d$, the next transmission power $P_{n+1}$ is set as a value of $(P_{n-1}+D)$ in the step 112.

If, in the step 107, the sum period $T_{sum}$ (I) is not longer than the delay time $T_d$, the next transmission power $P_{n+1}$ is set as a larger one of values $(P_d+D)$ and $P_{n-1}$ in the step 111.

Figure 5B:
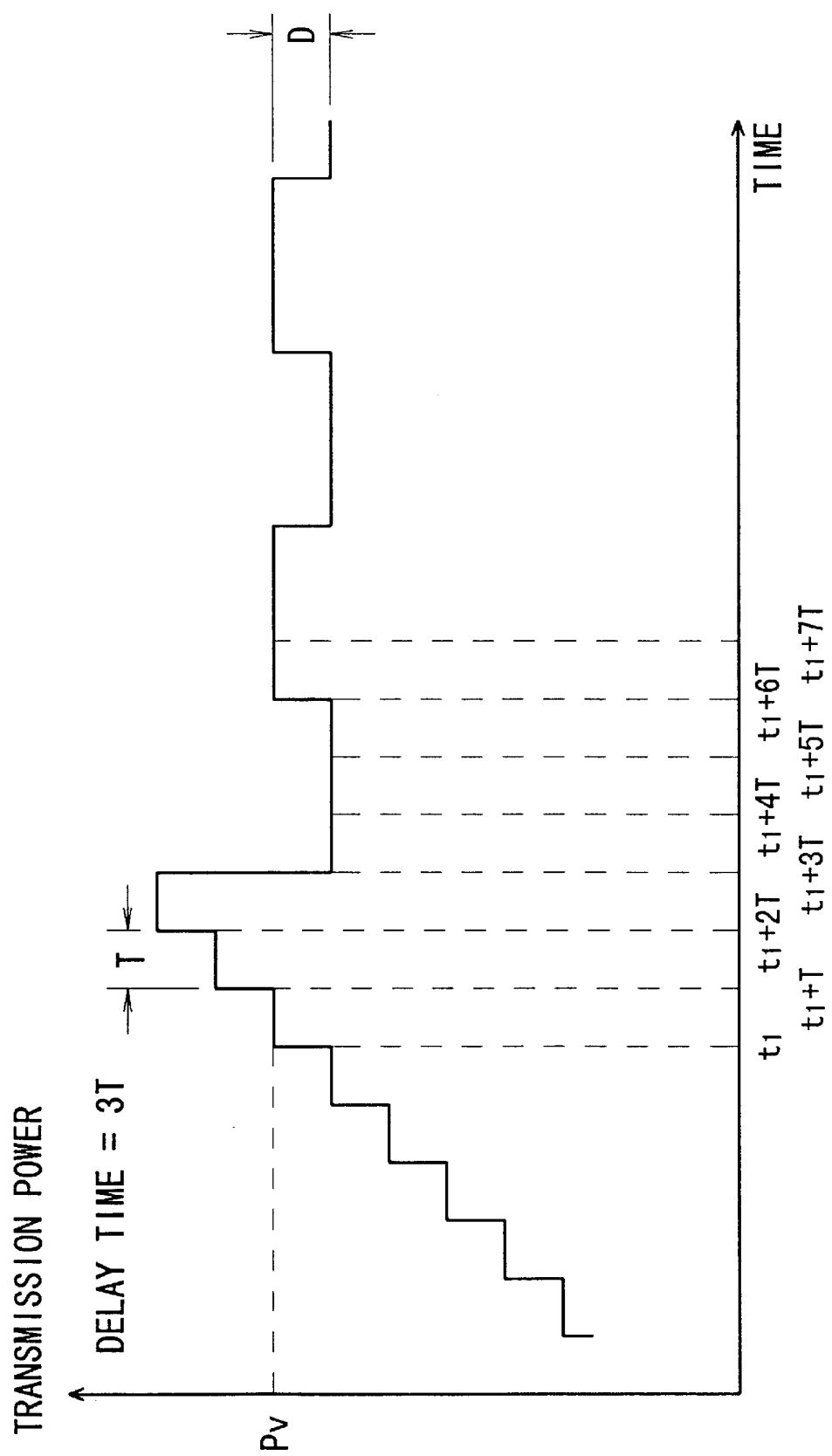
FIG. 5B is a diagram showing the change of the transmission power with time in the transmission power control method according to the first embodiment.

FIGS. 5A and 5B show the change of the average CIR and the transmission power with time in the transmission power control method according to the first embodiment, respectively, in which the delay time $T_d$ of the system is 3T.

Also, small arrows in FIG. 5A indicate the content of the commands delivered within the respective control periods. The upward arrow means the increase command, and the downward arrow means the decrease command.

As shown in FIG. 5A, within the control periods prior to the time $t_1$, the measured value z of the average CIR is less than the reference value $L_v$. Therefore, the mobile station 721 on the receiving side successively transmits the increase commands to the base station 720 on the transmitting side.

Thus, the transmission power of the base station 720 is increased step by step by the constant value D through the steps 103, 105, 107, and 112, as shown in FIG. 5B.

Within the control period from the time $T_1$ to $(t_1+T)$, the measured value z of the average CIR becomes equal to the reference value $L_v$ (steps 100 and 101). Therefore, the mobile station 721 on the receiving side transmits the "decrease command" to the base station 720 on the transmitting side (step 102).

Since the preceding command $C_{n-1}$ is the increase command in the preceding control period $T_{n-1}$ in the step 104, the next transmission power $P_{n+1}$ is set as $(P_d-D)$ in the step 110. However, since the transmission power control system shown in FIG. 3 has the delay time of 3T, the transmission power is not increased immediately, and it is first decreased at the time $(t_1+3T)$.

Here, the transmission power $P_d$ at the time prior to the delay time $T_d$ (i.e., at the time $t_1$) is equal to the transmission power $P_v$. Therefore, the transmission power within the control period from the time $(t_1+3T)$ to the time $(t_1$ to 4T) is set as $(P_v-D)$.

Within the control period from the time $(t_1+4T)$ to the time $(t_1+5T)$, since $z<L_v$, the mobile station 721 transmits the increase command to the base station 720 (step 103). Then, the preceding command is the increase command in the step 105, and $T_{sum}$ (T)<$T_d$ in the step 107. Therefore, the transmission power is set as a larger one of the values $(P_d-D)$ $(=P_v)$ and $P_{n-1}$ $(=P_v+D)$, i.e., $(P_v+D)$.

Within the control period from the time $(t_1+5T)$ to the time $(t_1+6T)$, because of the same reason as that of the control period from the time $(t_1+4T)$ to the time $(t_1+5T)$, the transmission power is set as $P_{n-1}=P_v+D$.

Within the control period from $(t_1+6T)$ to $(t_1+7T)$, since $z=L_v$, the mobile station 721 transmits the decrease command to the base station 720 (step 102). Then, the preceding command is the increase command in the step 104 and therefore, the transmission power is set as $(P_d-D)=P_v$.

As described above, with the transmission power control method according to the first embodiment, the next transmitting power for the next control period $T_{n+1}$ in the mobile station 721 on the transmitting side has a small fluctuation. This means that the periodic, oscillatory change of the transmission power in the above conventional method is able to be restrained.

As a result, the signal quality is able to be kept approximately constant.

It is seen from FIG. 5B that the maximum fluctuation width of the transmission power is equal to D in the first embodiment.

Second Embodiment

In a transmission power control method according to a second embodiment of the present invention, the same transmission power control system shown in FIG. 3 is used.

Figure 6:
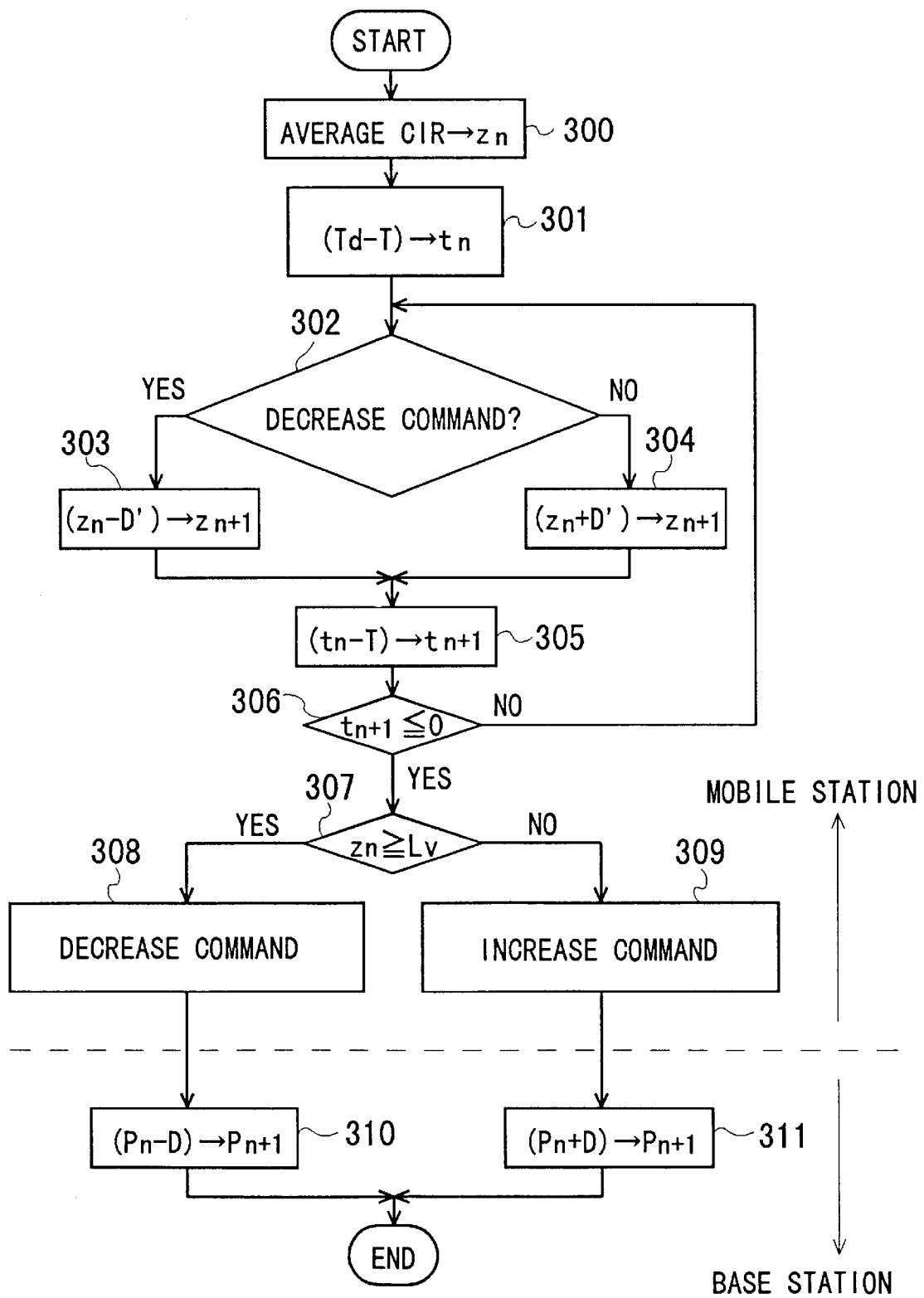
FIG. 6 is a flowchart illustrating the transmission power control method according to the second embodiment.

The transmission power control method according to the second embodiment has the step sequence shown in FIG. 6. This sequence is periodically performed in the base station 720 and the mobile station 721 during communication. In this case, one of the base station 720 and the mobile station 721 is on the transmitting side and the other is on the receiving side.

First, the average CIR within the current or n-th control period $T_n$ for the radio communication channel in use is measured by the level detector 714 in the mobile station 721 on the receiving side. Thus, a measured current value $z_n$ of the average CIR in the n-th control period $T_n$ is obtained in the step 300.

Next, the control period T is subtracted from the delay time $T_d$ in the step 301, thereby obtaining a time $t_n$.

Then, it is judged in the step 302 whether the prior command within the control period prior to the time $t_n$ with respect to the current control period $T_n$ is the decrease command or not. If the command within this control period is the decrease command, a value $z_{n+1}$ is set as $(z_n-D')$ in the step 303, where D' is a predetermined incremental or decremental value of the CIR. If the command within this control period is not the decrease command, the value $z_{n+1}$ is set as $(z_n+D')$ in the step 304.

Subsequently, the control period T is further subtracted from the current time $t_n$ is the step 305, thereby obtaining a time $t_{n+1}$.

It is judged whether the value $t_{n+1}$ is less than or equal to 0 in the step 306. Then, if the value $t_{n+1}$ is greater than 0, the steps 302 to 306 are repeated. If the value $t_{n-1}$ is less than or equal to 0, the measured value $z_n$ is then compared with the reference value $L_v$ in the step 307.

The above steps 300 to 307 are performed by the controller 712 in the mobile station 721 on the receiving side.

Then, if the measured value $z_n$ of the average CIR is greater than or equal to the reference value $L_v$ in the step 307, a next command $C_{n+1}$ for decreasing the transmission power (i.e., the decrease command) with respect to the current transmission power is delivered by the controller 712 of the mobile station 721 to the base station 720 on the transmitting side in the step 308.

If, in the step 307, the measured value $z_n$ of the average CIR is less than the reference value $L_v$, a next command $C_{n+1}$ for increasing the transmission power (i.e., the increase command) with respect to the current transmission power is delivered by the controller 712 of the mobile station 721 to the base station 720 in the step 309.

The base station 720 on the transmitting side that has received this transmission power control command takes the following steps on the command.

Specifically, when the received command is the decrease command, the next transmission power $P_{n+1}$ in the next control period $T_{n+1}$ is set as a value $(P_n-D)$ in the step 310. When the received command is the increase command, the next transmission power $P_{n-1}$ is set as a value $(P_n+D)$ in the step 311.

Figure 7A:
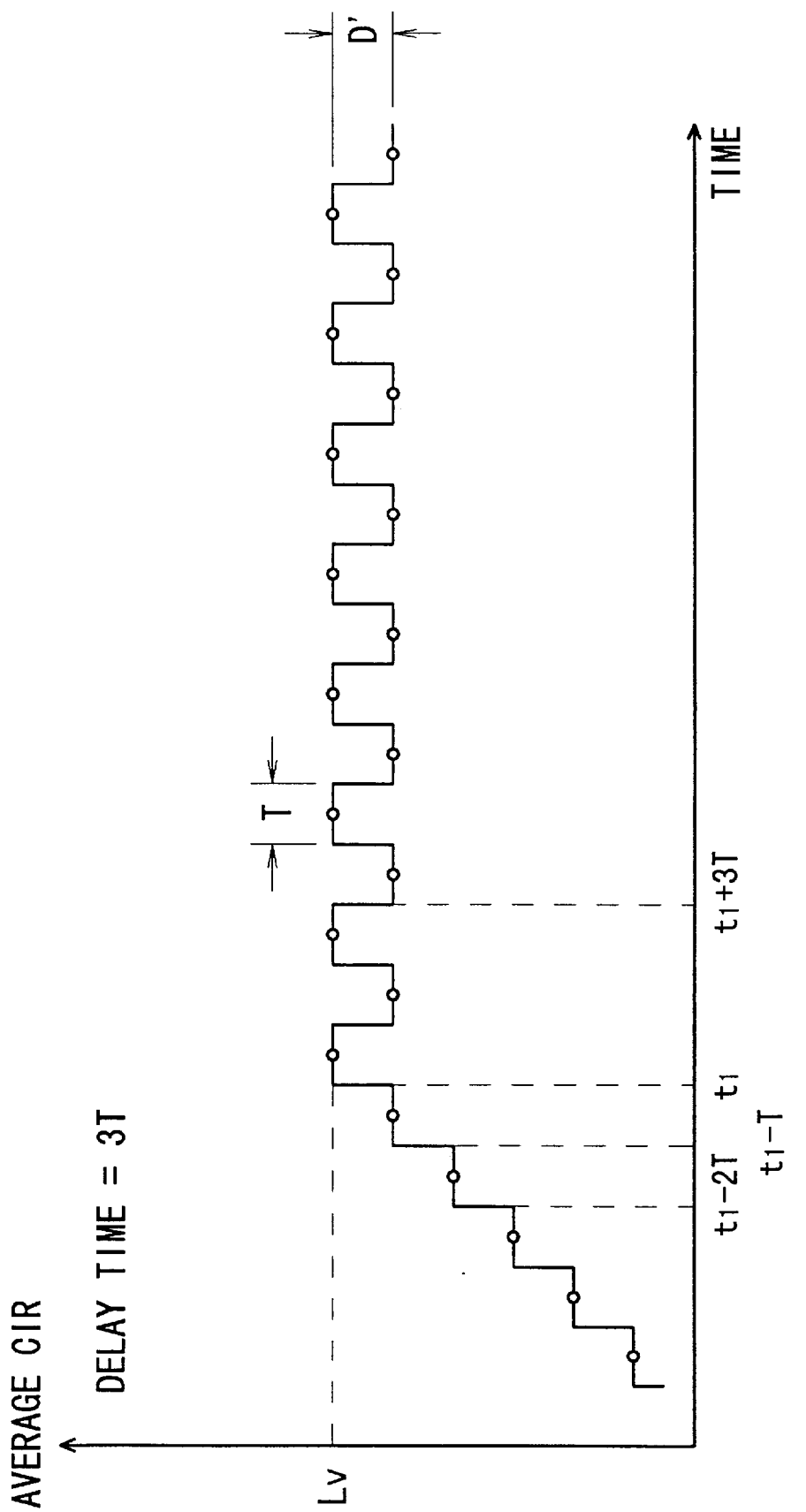
FIG. 7A is a diagram showing the change of the average CIR with time in the transmission power control method according to the second embodiment.
Figure 7B:
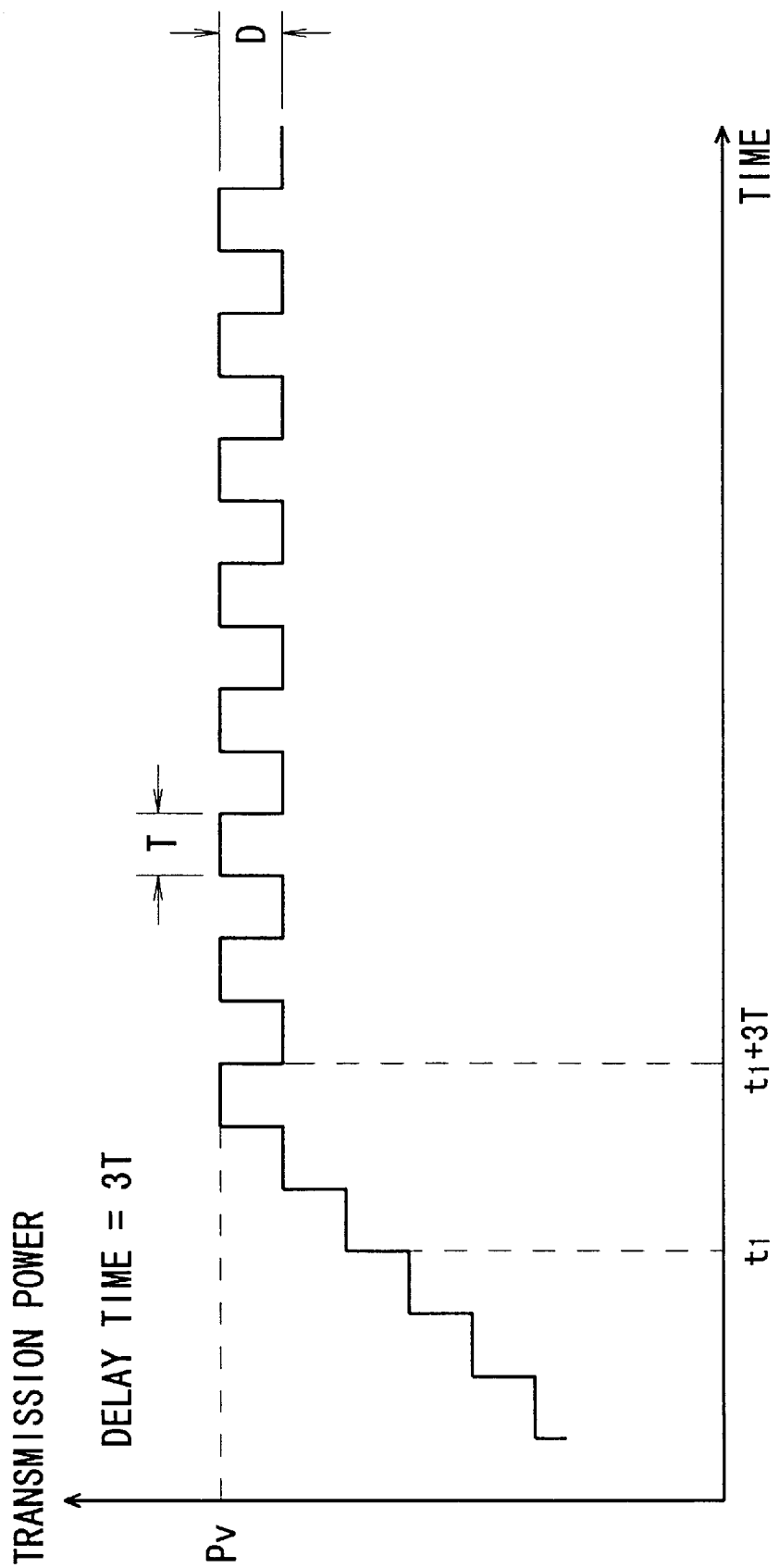
FIG. 7B is a diagram showing the change of the transmission power with time in the transmission power control method according to the second embodiment

FIGS. 7A and 7B show the change of the average CIR and the transmission power with time in the transmission power control method according to the second embodiment, respectively, in which the delay time $T_d$ is 3T.

As shown in FIG. 7A, within the control periods prior to the time $t_1$, the measured value $z_n$ of the average CIR is less than the reference value $L_v$. Therefore, the mobile station 721 on the receiving side successively transmits the increase commands to the base station 720 on the transmitting side. Thus, the transmission power of the base station 720 is increased step by step by the constant value D, as shown in FIG. 7B.

Within the control period from $t_1$ to $(t_1+T)$, the measured value z of the average CIR becomes equal to the reference value $L_v$. Since the transmission power control system shown in FIG. 3 has the delay time of 3T, the transmission power is not decreased immediately, and it is first decreased at the time $(t_1+3T)$.

The current value $z_n$ of the average CIR in the control period from $t_1$ to $(t_1+T)$ is compensated by using the prior transmission power control commands in the control period from the time $t_1$ to the time $(t_1-T)$ and the control period from the time $(t_1-T)$ to the time $(t_1-2T)$, which are within the delay time $T_d$. In other words, the current value $z_n$ in the control period from $t_1$ to $(t_1-T)$ is increased or decreased by the predetermined value D' according to the content of the prior transmission power control commands in the control period from $t_1$ to $(t_1-T)$ and the control period from $(t_1-T)$ to $(t_1-2T)$.

Here, the commands in the control period from $t_1$ to $(t_1-T)$ and that from $(t_1-T)$ to $(t_1-2T)$ are the increase commands. Therefore, the current value $z_n$ is compensated to a value of $(z+2D')$, and this compensated value is compared with the reference value $L_v$ in the step 307. This compensation is able to approximately cancel the delay time $T_d$ (=3T) of the system. As a result, the transmission power does not exceed the reference value $P_v$, as shown in FIG. 7A.

After the control period from $t_1$ to $(t_1-T)$, the steps 303 and 304 are performed alternately. Therefore, the transmission power alternately changes between $P_v$ and $(P_v-D)$, as shown in FIG. 7B.

As described above, with the transmission power control method according to the second embodiment, after the current value $z_n$ of the average CIR is measured in the step 300, the value $z_n$ is increased or decreased within the delay time $T_d$ by repeating the steps 302 and 306, thereby compensating the current value $z_n$.

therefore, the next value $P_{n+1}$ of the transmitting power for the (n+1)-th control period $T_{n+1}$ in the base station 720 on the transmitting side has a small fluctuation. This means that the periodic, oscillatory change of the transmission power in the above conventional method is able to be restrained.

As a result, the signal quality is able to be kept approximately constant.

It is seen from FIG. 7B that the maximum fluctuation width of the transmission power is equal to D in the second embodiment.

While the preferred form of the present invention has been described, it is to be understood that modifications will be apparent to those skilled in the art without departing from the spirit of the invention. The scope of the invention, therefore, is to be determined solely by the following claims.

What is claimed is:

1. A transmission power control method for a cellular type mobile communication network, in which a radio communication channel is established between a base station and a mobile station for performing communications;

said method comprising the steps of:

(a) detecting a current command for a current control period transmitted from a station on the receiving side by a station on the transmitting side; and (b) judging whether or not the content of said detected current command is the same as that of a preceding command for a preceding control period that has been detected by said station on the transmitting side;

when the content of said current command is not the same as that of said preceding command, the transmitting power for a next control period is set as a first value;

and said first value is obtained by either adding a predetermined value to a prior value of the transmission power for a prior control period that is prior to said current control period by a delay time, or subtracting said predetermined value from said prior value of the transmission power according to the content of said detected current command;

and said delay time is defined as a time from detection of said current command by said station on the transmitting side to realization of said detected current command;

and when the content of said current command is the same as that of said preceding command, and at the same time, a sum period of successive control periods having the same command which are prior to said current control period is not longer than said delay time, the transmission power for said next control period is set as a second value;

and said second value is a lower or higher one of said first value and said preceding value of the transmission power according to the content of said detected current command;

and when the content of said current command is the same as that of the preceding command, and at the same time, said sum period is longer than said delay time, the transmission power for said next control period is set as a third value;

and said third value is obtained by either adding said predetermined value to said preceding value of the transmission power, or subtracting said predetermined value from said preceding value of the transmission power according to the content of said detected current command.

* * * * *